April 12, 1955  B. R. CHAFFIN  2,706,132
ROLL AWAY AWNING FOR HOUSE TRAILERS
Filed Sept. 1, 1953  4 Sheets-Sheet 1
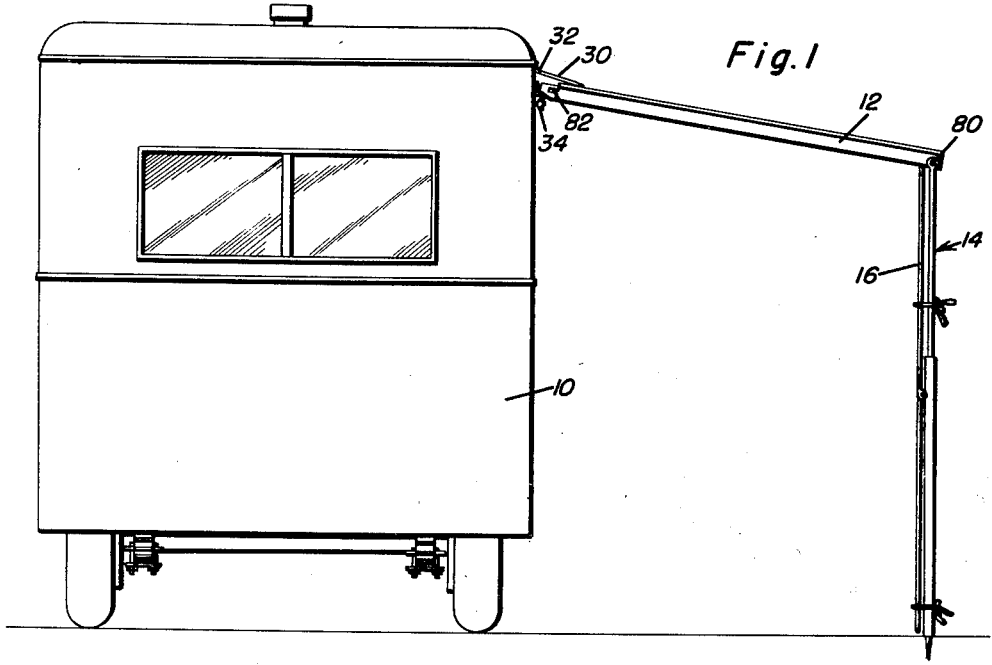
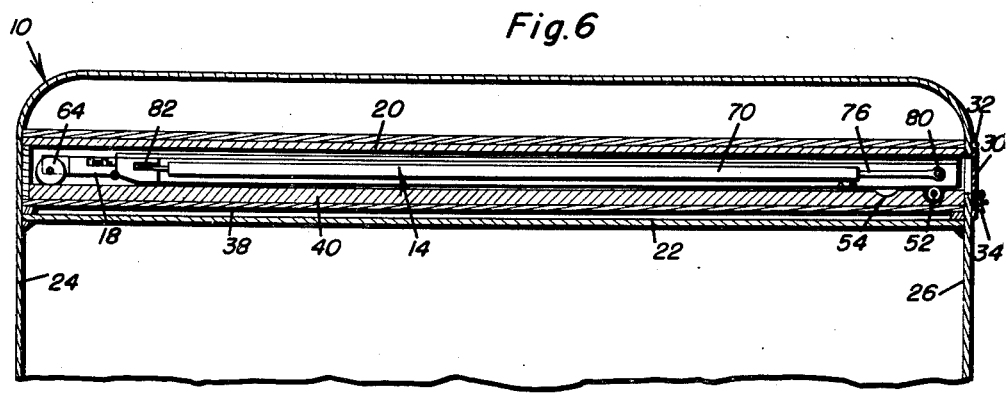
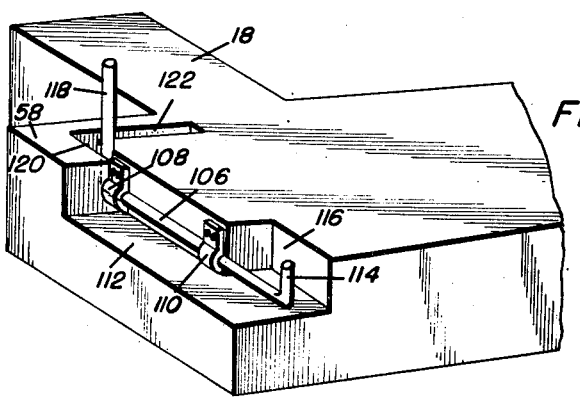
Bert Robert Chaffin
INVENTOR.

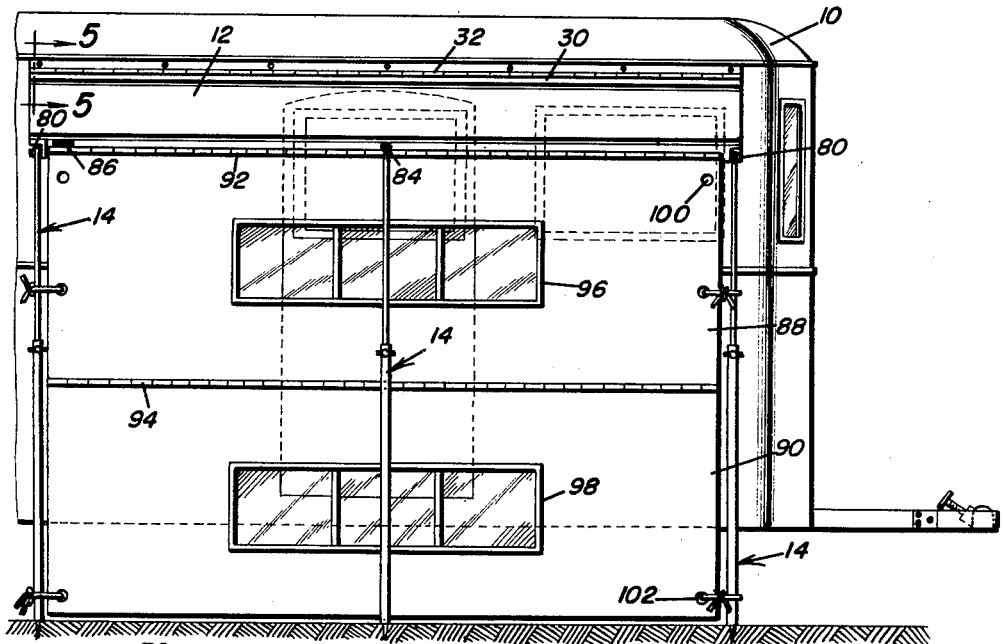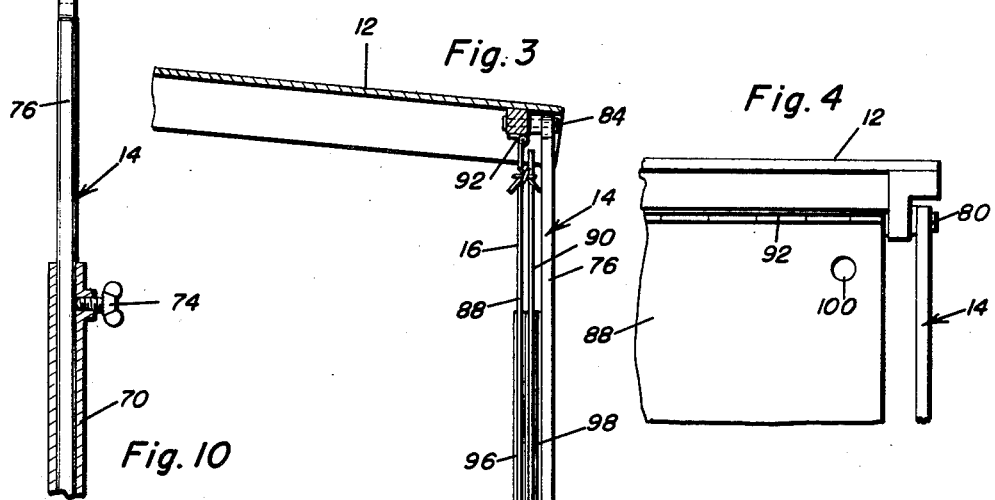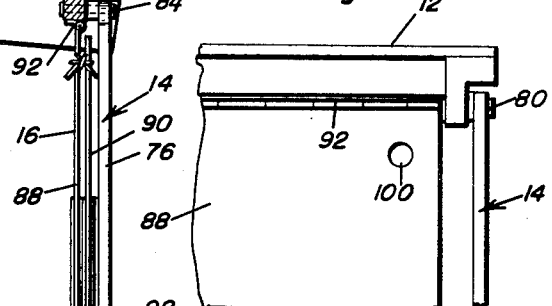

April 12, 1955   B. R. CHAFFIN   2,706,132
ROLL AWAY AWNING FOR HOUSE TRAILERS
Filed Sept. 1, 1953   4 Sheets-Sheet 3

Bert Robert Chaffin
INVENTOR.

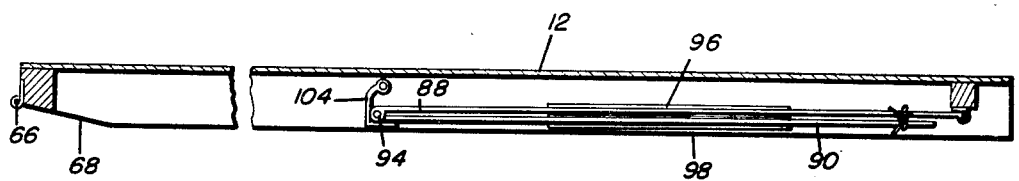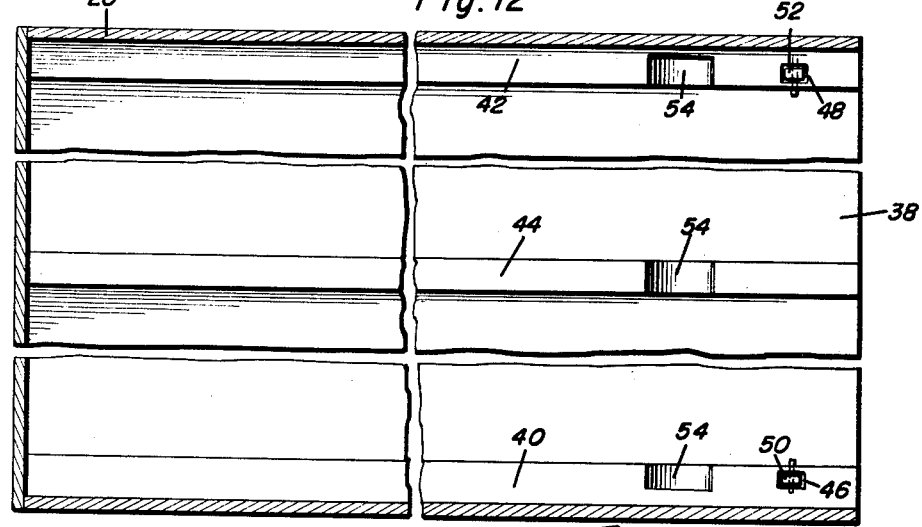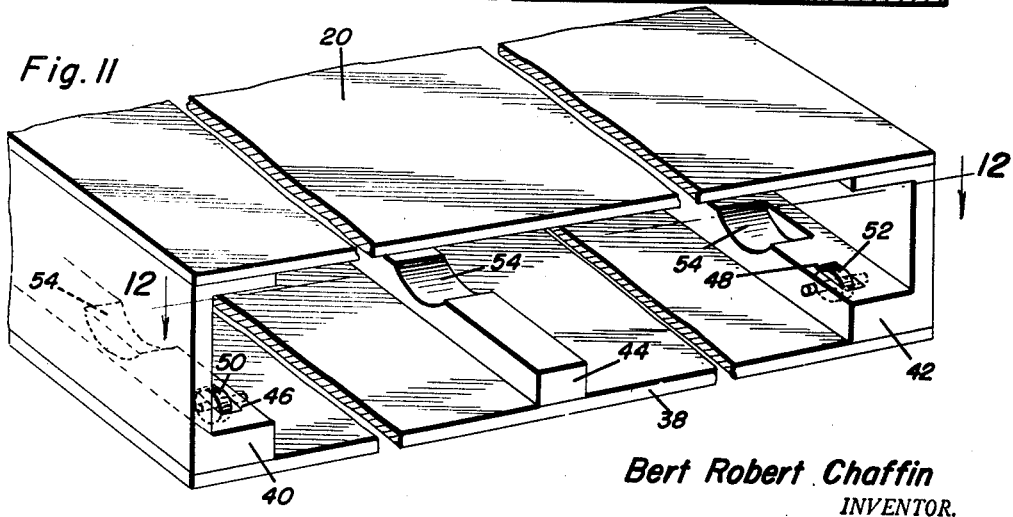

United States Patent Office 2,706,132
Patented Apr. 12, 1955

2,706,132

ROLL AWAY AWNING FOR HOUSE TRAILERS

Bert Robert Chaffin, West Riverside, Calif.

Application September 1, 1953, Serial No. 377,771

7 Claims. (Cl. 296—23)

This invention comprises novel and useful improvements in a roll away awning and more specifically pertains to an awning or canopy structure specifically adapted for trailers and the like and capable of being compactly folded, retracted and stored in a chamber within the trailer and which may be readily extended through an opening in the trailer to provide an adjustable awning or canopy extending from the side of the trailer.

The principal object of this invention is to provide an improved retractible awning structure specifically adapted for use with trailers and mounted in an improved, compactly recessed manner therein.

A further object of the invention is to provide an awning assembly wherein all of the elements of the awning may be extended from or compactly retracted into a housing for storage therein, and wherein the housing itself may be conveniently secured in a chamber in the side of a trailer or the like.

A further object of the invention is to provide an awning structure in conformity with the foregoing objects in which novel and improved means are provided for slidably mounting the awning roof, folding leg and curtain structures in a housing for ready movement from the housing into an extended position of the awning and into the housing for collapsing and storing the awning therein.

Another object of the invention is to provide an improved awning structure in accordance with the foregoing objects wherein the awning roof may be readily adjusted for various inclinations in accordance with the slope of ground upon which a trailer is standing; and wherein the end curtain of the awning may likewise be readily adjusted as desired.

A still further important object of the invention is to provide an improved means whereby the awning may be readily locked in its extended position with regard to the housing.

A final important object of the invention to be specifically enumerated herein, resides in the provision of the awning structure specifically adapted for use with trailers or the like wherein the entire awning assembly may be compactly stored within a housing or extended therefrom for use; the housing itself may be fixedly secured in a chamber in a wall of the trailer; and a closure for the opening in the wall of the trailer is provided for locking the housing therein; and for cooperating with the roof member of the awning in the extended position of the latter to prevent the ingress of rain or the like into the opening of the housing or trailer in the extended position of the awning.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an end elevational view of a trailer having the improved retractible awning of this invention applied thereto, the awning being shown in its extended position with the end curtains in place thereon;

Figure 2 is an elevational view taken from the right side of Figure 1 and showing the end curtain of the awning in position with the awning in its extended position;

Figure 3 is a detail view taken in vertical transverse section through a portion of the roof member of the awning and showing the manner in which the end curtain has its lower leaf folded upwardly and secured to its upper leaf and also to the supporting leg of the awning;

Figure 4 is an enlarged fragmentary view of one corner of the awning, showing the attachment of one of the corner legs to the roof member;

Figure 5:
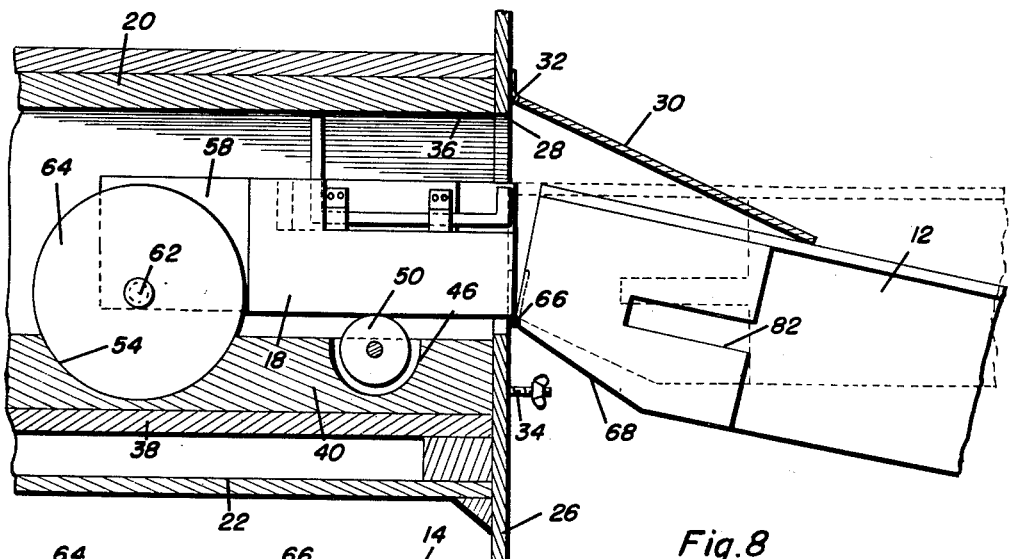
Figure 8:
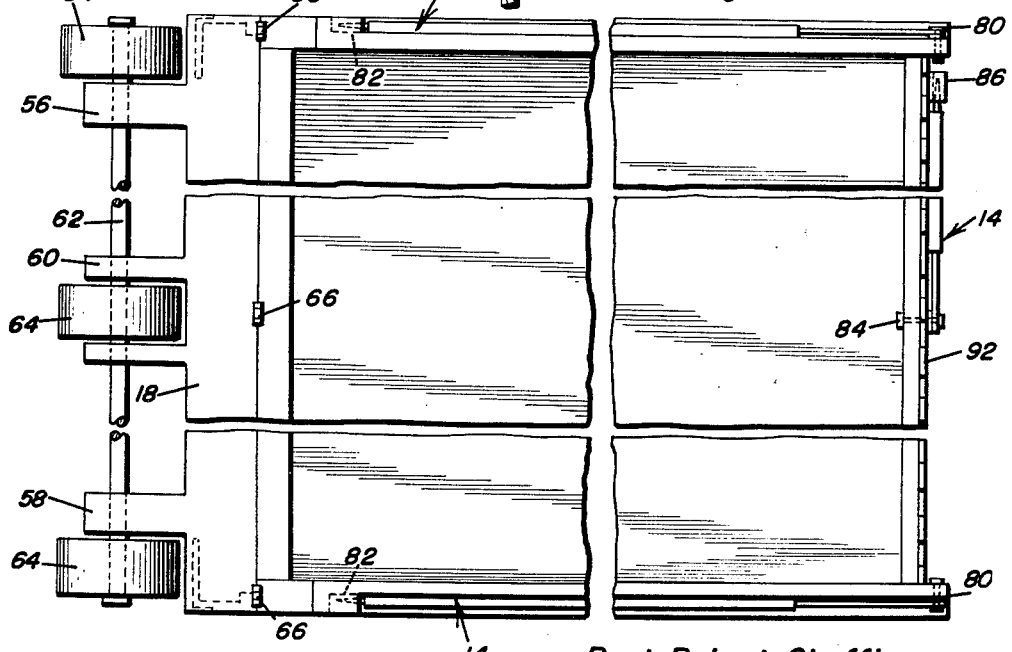

Figure 5 is an enlarged fragmentary sectional view taken at 5—5 in Figure 2, showing in particular the manner in which the carriage of the awning is locked in its extended position of the awning; and the manner in which the closure of the housing rests upon the roof member of the awning to seal the opening between the roof member and the housing; the dotted line portion showing the manner in which the awning roof member is moved into alignment with its carriage for movement into or out of the opening of the housing;

Figure 6 is a vertical transverse sectional view through the top portion of the trailer and showing the manner in which the housing is disposed in a chamber in the side wall of the trailer, and the awning roof member is received within the housing, the closure member being locked in its closed position for retaining the awning roof member within its housing and the housing within the trailer;

Figure 7 is a detail view showing in vertical transverse section the manner in which the end curtain of the awning is folded upon itself and is stored in collapsed position under and upon the under side of the roof member of the awning;

Figure 8 is a bottom plan view looking upwardly at the carriage and the roof member secured thereto, the supporting legs being shown in their folded position;

Figure 9 is a fragmentary perspective view of a portion of the carriage of the awning structure showing a locking means in its locking position by means of which the carriage is retained in the extended position of the awning;

Figure 10 is a view, partly in elevation and partly in vertical section, parts being broken away of one of the supporting legs of the awning;

Figure 11 is a fragmentary perspective view of a portion of the housing of the awning, showing in particular the tracks upon which the roof member and carriage member of the awning are slidably mounted, and also showing the wells in these tracks and the supporting rollers therein for cooperation with the carriage and with the roof member of the awning; and Figure 12 is a horizontal sectional view taken substantially upon the plane indicated by the section line 12—12 of Figure 11.

In the embodiment of the accompanying drawings, there is illustrated one manner in which the principles of the invention may be conveniently practiced. In this embodiment, the numeral 10 designates generally any conventional form of automotive house trailer to which the improved retractible awning of this invention is applied, although it will be understood that the awning may be applied to other structures than trailers and in general wherever an awning is required of a foldable or retractible nature.

The awning itself includes a roof member 12, foldable legs, each indicated generally by the numeral 14, and an end curtain indicated generally by the numeral 16, a carriage 18, see in particular Figures 5 and 8, to which the roof member of the awning is pivotally secured, and a housing 20. Referring particularly to Figure 6 of the drawings, it will be seen that the trailer 10, adjacent its roof, is formed with a chamber 22 extending along one side of the trailer adjacent the roof and extending transversely across the trailer substantially the entire distance between its side walls, these side walls being indicated at 24 and 26. The trailer side wall 26 is provided with an opening 28, see Figure 5, which is provided with a cover or closure 30 hinged to the wall of the trailer above the opening as by a horizontal hinge 32. A thumb screw 34 or other suitable fastener is provided upon the wall 26 for securing the lower end of the vertically pivoting closure 30 in closed position, as shown in Figure 6, when the awning is retracted and is stored in the housing, the latter being within the chamber in the trailer.

The housing itself, is a flat box-like member, as will be apparent from a comparison of Figures 5, 6 and 11, which has an opening 36 disposed in alignment with the opening 28 of the chamber 22. The housing is removably received within the chamber by any suitable means, not shown, whereby the awning and the housing as a unit may be inserted in or removed from the chamber 22, as desired. Generally, however, the housing will remain within the chamber whereby the awning will be extended from the housing into an operative position and retracted into the housing for storage therein, as set forth hereinafter.

The bottom wall of the housing, indicated by the numeral 38, is provided with a plurality of tracks, three being found to be satisfactory, as shown in Figure 11, these tracks being designated at 40 and 42 at the opposite sides of the housing against the side walls thereof, and at 44 intermediate the side walls of the housing. The side wall tracks 40 and 42 are preferably provided with recesses 46 and 48 respectively in which are journaled supporting rollers 50 and 52. These rollers serve to support the underside of the carriage when the latter is moved toward the opening 36 of the housing, as shown in Figure 5; and to slidably support the bottom side of the roof member of the awning when the awning is retracted into the housing, as shown in Figure 6. These rollers 50 and 52 thus facilitate the sliding movement of the awning assembly within the housing.

Each of the tracks 40, 42 and 44 is provided adjacent the open ends of the housing with an appropriately positioned semi-circular recess or well 54. The purpose of this well will be set forth hereinafter.

As will be best apparent, from Figures 5, 8 and 9, the awning carriage 18 consists of a flat body or block whose width is substantially equal to the distance to the side walls of the housing. The opposite ends of the carriage are adapted to be loosely and slidably received between the top and bottom surfaces of the C-shaped end tracks 40 and 42, see Figure 11, whereby the carriage may be moved along the tracks. At what may be termed its rear end, the carriage 18 is provided with a plurality of rearwardly extending projections 56 and 58 at its opposite ends, and a centrally located rearwardly extending bifurcated projection 60 therebetween. By means of an axle 62 extending through these projections, a plurality of rollers 64 are journaled adjacent each of these projections in position for riding upon the tracks 40, 42 and 44.

At what may be termed its forward end, the carriage or body 18 is provided with a plurality of horizontal hinges 66 by means of which the rearward end of the roof member 12 is hinged to the carriage for vertical pivoting movement with respect thereto.

The roof member may be of any desired construction but preferably is of a rigid nature. The roof may consist of a single panel, or may comprise a plurality of panels rigidly connected together; and may be louvered to provide ventilation through the roof in accordance with known practice. In any event, the upper or rearward end of the roof member 12 is connected by the hinges 66 to the carriage 18 and as shown in full lines and dotted lines in Figure 5, the roof member may be tilted or pivoted vertically with respect to the carriage. It will be observed that the rearward lower surface of the roof member is beveled or inclined as at 68, to facilitate passage of the roof through the opening 28 and to facilitate movement of the rear end of the roof member up over the supporting rollers 50 in the tracks 40 and 42 during the inward or retracting movement of the awning. It should be distinctly observed that the roof member is disposed in horizontal alignment with its carriage in the retracted position of the awning, as shown in Figure 6, and during the outward movement of the roof member and carriage until such time as the roof member completely emerges from the opening 28 and is then free to pivot downwardly from its horizontal dotted line position of Figure 5 to an inclined position, as shown in full lines therein.

It also should be noted that the closure member 30 is free to pivot upwardly or downwardly so that the lower edge of the same will rest upon the roof member, upon the upper surface of the latter, as soon as a portion or all of the roof member has been extended from the opening in the housing and chamber. The closure thus serves the dual functions of providing a cover to close the openings 28 and 36 when the awning is in its completely retracted position, and also serves as a cover or seal when the awning is extended to prevent the ingress of rain into the housing at that time.

Referring now to Figure 5, it will be apparent that when the awning has been extended sufficiently from the housing to enable the awning to tilt downwardly from its dotted line position to its operative full line position, the supporting rollers 64 will reach and drop into the wells or recesses 54 in the tracks 40, 42 and 44. The weight of the carriage 18 will tend to maintain the rollers in these wells and thus will serve to secure and retain the awning in its extended position. A locking means hereinafter described, is employed to positively retain the rollers in the well and thus lock the awning in its extended position.

Attention is now directed to Figure 10 wherein it will be seen that each of the supporting legs 14 is of adjustable length, consisting of a lower cylindrical member 70 having a pointed lower extremity 72 and being provided with a locking set screw 74 at its upper end whereby the member 70 may be readily secured in longitudinally adjusted position upon its upper section 76, which it slidably embraces. This upper section in turn is provided with an enlarged eye 78 by means of which the leg is pivotally secured to the roof member of the awning. Referring now in particular to Figure 8, as well as to Figure 2, it will be seen that a pair of legs are pivoted to the opposite forward ends of the roof member as by pivot pins 80, the legs carried by these pivot pins being disposed upon the outer edges of the awning. The arrangement is such that when the legs are in their shortened position, they may be folded up under the roof member 12 and their pointed extremities 72 may be received in lateral slots or recesses 82 in the outer sides of the awning roof member, this folded and stored position of the legs being shown in Figures 6 and 8. A third supporting leg 14 is provided, this being secured by a pivot pin 84 to the mid portion of the front edge of the awning roof member whereby this leg, in its folded and stored position, will be swung up along the front edge of the awning and may have its pointed extremities secured in a fastening clip 86, shown in Figure 2, Figure 8 showing the leg in its folded position.

As so far described, it will thus be apparent that the legs may be readily folded into the confines of the roof member and may be retracted therewith into the housing for storage when not in use. When the roof member is extended, however, the legs may be lowered and adjusted in length to support the roof member at any desired inclination with respect to the trailer, and this despite any inequalities in the levelness of the ground upon which the trailer stands.

Also hinged to the forward end of the roof member but to the underside of the same is the end curtain 16. As will be best seen from Figure 2 and also indicated in Figures 1, 3, 2, 7 and 8, this end curtain is of two leaves or panels. The end curtain consists of an upper section 88 and a lower section 90. It is preferred to have these sections of a rigid construction, either by forming the same of sheet metal, or if of a pliable material, such as fabric, by providing stays to reinforce and stiffen the same. The upper section 88 is secured to the underside of the front edge of the roof member by a horizontal hinge 92 which may be of the piano lid type. A similar type of hinge 94 is provided to secure the second section 90 to the upper section 88. Either or both of these sections may be provided with window openings 96 and 98.

The sections of the end curtain are provided with suitable eyelets 100 and 102 whereby the edges of the sections may be tied to the support legs, as shown clearly in Figure 1, when the end curtains are in their lowered position. Alternatively, the lower section may be folded upwardly upon the upper section, as shown in Figure 3, whereby the two window openings 98 and 96 will be in alignment with each other so that the upper portion only of the end curtain will be used and yet openings will be provided for vision.

When the use of the end curtains is not desired, or when the awning is to be stored, the lower section will be folded upon the upper section, and the two sections together will be swung up against the underside of the roof member of the awning, as shown in Figure 7, and the lower hinged edge 94 of these sections will then be engaged in a pivoted hook or clamp 104 whereby the sections will be retained under and folded into the roof member for convenient storage of the latter in the housing, as set forth hereinbefore.

Referring especially to Figures 9 and 5, it will be seen that the locking ends provided to retain the supporting roller 64 of the carriage in the wells 54 when the awning is in its extended position consist of a rod 106 which is rotatably secured by journaling brackets 108 and 110 in a recess 112 in the top surface of the carriage. As shown in Figure 8, a similar locking device is provided at each side of the carriage. The shaft 106 has an upturned operating handle 114 at one end, which is oscillatable in a cut-away enlargement 116 of the recess 112. At the other end of the rod 106, there is provided a considerably longer latching arm 118. The top surface of the carriage is provided with an L-shaped passage having one portion 120 opening into the recess 112 and receiving the end of the rod 106 for axial sliding movement therein, while the other portion 122 of the L-shaped recess is disposed to receive the latch arm 118 when the latter is pivoted downwardly into and below the upper surface of the carriage.

The arrangement is such that when the rod 106 is moved towards the left, as viewed in Figures 5 and 9, the actuating handle 114 may be rotated in a clockwise direction whereby the latching lever 118 will move downwardly into and be received within the groove 122. This is the inoperative position of the locking device and is the position assumed by the same during sliding movement of the carriage and awning member relative to the housing, and at all times except when the awning is in its extended position and it is desired to lock the same against further movement in either direction.

When the rod 106 is rotated in a counter clockwise direction by manipulation of the handle 114, thereby raising the latch arm 118 upwardly and out of the slot 22 to the position shown in Figure 9, it will be observed that the upper end of the vertically disposed latching arm 118 will bear against the under surface of the top wall of the track members 40 and 42, as shown in Figure 5. This position can be assumed only when the carriage has been lowered by the supporting rollers 64 dropping down into the wells 54. When this position is assumed, as shown in Figure 5, the locking device is then moved axially towards the right, as viewed in Figures 5 and 9, whereby the latching arm 118 is moved into the portion 120 of the L-shaped slot, thereby holding the latching arm in its elevated or latching position. It will be seen that this manipulation of the locking device is only possible when the awning is in its extended position and access can be had to the handle 114 through the opening 28.

In order to release the locking device and permit the awning to be retracted from the position of Figure 5 into the position of Figure 6, it is necessary to first slide the rod 106 axially towards the left until the latching arm 118 is in alignment with the groove 122; then rotate the rod 106 in a clockwise direction thereby pivoting the arm 118 downward into the groove 122. At this time, the roof may then be lifted from the full line to the dotted line position in Figure 5 and the entire roof assembly then slid inwardly of its housing, the roller 64 being then free to rise out of the wells 54 and onto the tracks 40, 42 and 44.

From the foregoing, the construction and operation of the device will be readily understood and further explanation is believed to be unnecessary. However, since numerous modifications and changes will readily occur to those skilled in the art, it is not desired to limit the invention to the exact construction shown and described and accordingly, all suitable modifications and equivalents may be resorted to, falling within the scope of the appended claims.

What is claimed as new is as follows:

1. A retractable awning for trailers and the like comprising a housing having an opening along one side thereof, said housing having tracks extending from said opening to the opposite side thereof, a carriage supported on rollers running on said tracks, and an awning roof member hinged to the outer edge of said carriage, said tracks having wells provided therein adjacent said opening, whereby said rollers are received within said wells to retain said carriage in position for fully extending said roof member.

2. A retractable awning for the trailers and the like comprising a housing having an opening along one side thereof, said housing having tracks extending from said opening to the opposite side thereof, a carriage supported on rollers running on said tracks, an awning roof member hinged to the outer edge of said carriage, said tracks having wells provided therein adjacent said opening, whereby said rollers are received within said wells to retain said carriage in position for fully extending said roof member, and lock means operable to prevent removal of said rollers from said wells whereby said roof member is retained in its extended position.

3. A retractable awning for trailers and the like comprising a housing having an opening along one side thereof, said housing having tracks extending from said opening to the opposite side thereof, a carriage supported on rollers running on said tracks, an awning roof member hinged to the outer edge of said carriage, said tracks having wells provided therein adjacent said opening, whereby said rollers are received within said wells to retain said carriage in position for fully extending said roof member, and supporting rollers journaled within said housing and engaging the underside of said carriage and said roof member for supporting the carriage and roof member during sliding movement of the same.

4. A retractable awning for trailers and the like comprising a housing having an opening along one side thereof, said housing having tracks extending from said opening to the opposite side thereof, a carriage supported on rollers running on said tracks, an awning roof member hinged to the outer edge of said carriage, said tracks having wells provided therein adjacent said opening, whereby said rollers are received within said wells to retain said carriage in position for fully extending said roof member, supporting legs pivoted to the edge of said roof member opposite said carriage, a curtain hinged to the edge of said roof member opposite said carriage, means for securing said curtain to said legs, and means for securing said curtain to the underside of said roof member.

5. A retractable awning for trailers and the like, as defined in claim 2, wherein said locking means comprises a rod having an arm attached integrally thereto, said rod being mounted on said carriage for pivotal movement between an unlocked position with said arm flat against said carriage, and a locked position wherein the free end of said arm engages the top of said housing to hold said rollers down in said wells, and means for turning said rod between said locked and unlocked positions.

6. A retractable awning for trailers and the like, as defined in claim 2, wherein said lock means comprises a rod having an arm attached integrally thereto, said rod being disposed within one leg of an L-shaped recess in said carriage and being supported therein for sliding and rotational movements between locked and unlocked positions, said arm being received within the other leg of said recess when in said unlocked position, and being turned to an upright position and shifted longitudinally in said recess when in said locked position, the free end of said arm engaging the top of said housing to hold said rollers down in said wells, and the sides of said recess holding said arm in said upright position, and a handle on said rod for turning and sliding the latter between said two positions.

7. A retractable awning for trailers and the like, comprising a housing having an opening along one edge thereof, a roof member disposed within said housing and movable thru said opening to an extended position, a curtain attached to the outer edge of said room member, said curtain being divided into upper and lower halves, each of said curtain halves having a window provided therein, said lower half being foldable to lie flat against said upper half, and the window in said lower half registering with the window in said upper half so that unobstructed view is obtained thru said superposed windows when the lower half of said curtain is folded up against said upper half, folding legs attached to the corners of said roof member, and means for attaching said curtain to said legs.

References Cited in the file of this patent

UNITED STATES PATENTS

| | | |
|---|---|---|
| 1,752,571 | Olson | Apr. 1, 1930 |
| 2,107,608 | Hewlett | Feb. 8, 1938 |
| 2,573,060 | Rauglas | Oct. 30, 1951 |